US011227334B2

(12) United States Patent
Prakoso et al.

(10) Patent No.: US 11,227,334 B2
(45) Date of Patent: *Jan. 18, 2022

(54) METHOD AND SYSTEM FOR FACILITATING ACCESS TO RECORDED DATA

(71) Applicant: NASDAQ TECHNOLOGY AB, Stockholm (SE)

(72) Inventors: Max Prakoso, Haymarket (AU); Andi Hakim, Campsie (AU); Robert Lang, North Wahroonga (AU)

(73) Assignee: NASDAQ TECHNOLOGY AB, Stockholm (SE)

( * ) Notice: Subject to any disclaimer, the term of this patent is extended or adjusted under 35 U.S.C. 154(b) by 283 days.

This patent is subject to a terminal disclaimer.

(21) Appl. No.: 16/392,918

(22) Filed: Apr. 24, 2019

(65) Prior Publication Data

US 2019/0251633 A1 Aug. 15, 2019

Related U.S. Application Data

(63) Continuation of application No. 13/419,692, filed on Mar. 14, 2012, now Pat. No. 10,311,513.

(51) Int. Cl.
*G06Q 40/04* (2012.01)
*G06F 16/22* (2019.01)

(52) U.S. Cl.
CPC ............. *G06Q 40/04* (2013.01); *G06F 16/22* (2019.01)

(58) Field of Classification Search
CPC ................................ G06Q 40/04; G06F 16/22
See application file for complete search history.

(56) References Cited

U.S. PATENT DOCUMENTS

| | | | |
|---|---|---|---|
| 6,006,232 A | 12/1999 | Lyons | |
| 8,301,785 B2 | 10/2012 | Jeong | |
| 9,081,829 B2* | 7/2015 | Bhave | G06F 16/2477 |
| 2002/0061029 A1 | 5/2002 | Dillon | |
| 2003/0014399 A1 | 1/2003 | Hansen et al. | |
| 2005/0192994 A1* | 9/2005 | Caldwell | H03M 7/3084 |
| 2007/0130226 A1* | 6/2007 | Banerjee | G06F 16/217 |
| 2008/0183737 A1* | 7/2008 | Bhalotia | G06F 16/93 |

(Continued)

FOREIGN PATENT DOCUMENTS

EP 0 996 126 A1 4/2000

OTHER PUBLICATIONS

International Search Report and Written Opinion of the International Searching Authority dated Jun. 26, 2013 in International Application No. PCT/EP2013/054992.

(Continued)

*Primary Examiner* — Matthew J Ellis
(74) *Attorney, Agent, or Firm* — Nixon & Vanderhye, PC

(57) ABSTRACT

The present invention relates to a method and system for facilitating access to recorded data. The system comprises an interface and a processing device. The interface is arranged to receive data and the processing device is arranged to separate the received data in data subsets, compress each data subset and assign an identifier to each compressed data subset, thereby creating data units each comprising a compressed data subset and an associated identifier, the processing device further being arranged to establish an index on the basis of the assigned identifiers.

20 Claims, 2 Drawing Sheets

(56) References Cited

U.S. PATENT DOCUMENTS

| | | | | |
|---|---|---|---|---|
| 2008/0215546 A1* | 9/2008 | Baum | .............. | G06F 16/24568 |
| 2008/0222111 A1* | 9/2008 | Hoang | .................. | G06F 16/21 |
| 2008/0229037 A1* | 9/2008 | Bunte | .................. | G06F 16/113 |
| | | | | 711/162 |
| 2009/0307249 A1* | 12/2009 | Koifman | .............. | G06F 3/0659 |
| 2010/0082417 A1* | 4/2010 | Wu | .................. | G06Q 30/0216 |
| | | | | 705/14.18 |
| 2010/0332379 A1* | 12/2010 | Ram | ...................... | G06F 40/18 |
| | | | | 705/37 |
| 2011/0131347 A1* | 6/2011 | Marshall | ................ | G06F 13/28 |
| | | | | 710/22 |
| 2011/0202497 A1* | 8/2011 | Marschall | ............ | G06F 16/217 |
| | | | | 707/602 |
| 2012/0047264 A1 | 2/2012 | Parthasarathy et al. | | |
| 2012/0130995 A1 | 5/2012 | Risvik et al. | | |
| 2012/0330931 A1* | 12/2012 | Nakano | .............. | G06F 16/2474 |
| | | | | 707/722 |
| 2013/0047169 A1 | 2/2013 | Gagliardi et al. | | |
| 2013/0159281 A1 | 6/2013 | Yang et al. | | |

OTHER PUBLICATIONS

T.R. Haining, et al., "Management Policies for Non-Volatile Write Caches", Performance, Computing and Communications Conference, 1999 IEEE International, Feb. 10, 1999, XP010323665, pp. 324-325.

IBM: "Tivoli Storage Manager for HSM for Windows Version 6.1", Jan. 1, 2010, pp. 1-176, XP055010002, URL:http://publib.boulder. ibm.com/infocenter/tsminfo/v6/topic/com.ibm.itsm.hsmwin.doc/b_ hsm_guide_win.pdf.

* cited by examiner

METHOD AND SYSTEM FOR FACILITATING ACCESS TO RECORDED DATA

CROSS REFERENCE TO RELATED APPLICATION

This application is a continuation of U.S. patent application Ser. No. 13/419,692 filed Mar. 14, 2012, the entire contents of which are incorporated herein by reference.

TECHNICAL FIELD

The invention relates to a method of, and a system for, facilitating access to recorded data.

BACKGROUND

Existing market surveillance systems provide approaches to monitor and control securities markets. Typically, the market surveillance systems provide a comprehensive real-time database of trading activity, as well as a structure to analyse and process data for suspected market abuse activities.

Traditionally, every transaction performed during a trading day at a market place, such as a security exchange, has on a daily basis at market closing been compressed and stored in a data file in order to make historical transactions manageable and accessible. However, this prior art approach introduces several problems when trying to detect market abuse activities using historical data. For example, when analysing past and present trading activities of a particular participant over a certain period of time, all trading data files within the period must be decompressed and the files searched for every single transaction relating to the participant. With the number of transactions passing through the market surveillance systems reaching levels of 700 000 transactions per second and being on the rise, analysis of data and detection of abusive patterns and activities in historical data, and in particular analysis of current data in real time, is a very cumbersome task.

The increased number of transactions passing through the market surveillance systems results in an ever increasing amount of data to analyse, in order to detect market abuse. The approach in the art of having to decompress great amounts of data all at once and subsequently undertaking vast search and analysis operations makes detection of certain patterns in the recorded difficult if not unfeasible.

SUMMARY

An object of the present invention is to solve or at least mitigate these problems in the art. To this end, there is provided a method of, and a system for, facilitating access of recorded data.

The system comprises an interface and a processing device. In the system, the interface is arranged to receive data and the processing device is arranged to separate the received data in data subsets, assign an identifier to each data subset and compress each data subset, whereby data units each comprising a compressed data subset and an associated identifier are created. The processor is further arranged to establish an index on the basis of the assigned data subset identifiers. The established index advantageously facilitates subsequent access of data units recorded in an appropriate memory.

The method comprises receiving data, separating the received data in data subsets and compressing each data subset. Further, the method comprises assigning an identifier to each compressed data subset, thereby creating data units each comprising a compressed data subset and an associated identifier, and establishing an index on the basis of the assigned identifiers.

Thus, the received data, which typically relates to market transactions, is separated in data subsets and compressed, and an identifier is assigned to each compressed data subset. The size of each data subset is configurable; larger subsets translate to faster scan, smaller index and slower random lookup due to need to decompress larger amounts of data, while smaller subsets accordingly translate to slower scan, larger index and faster random lookup. An appropriate index, as will be defined in embodiments of the invention discussed in the following, is established on the basis of the assigned data subset identifiers. This indexing subsequently enables swift and straightforward accessing of stored market transaction data. Hence, if data are to be analysed for detecting certain patterns indicating possible market abuse, the established index can be utilized to find and decompress required data. Further, a windowing view of the received data can be provided. Advantageously, a complete order book view can for instance be provided at any given time of the day without loading and/or processing all transactions prior to window of interest.

In an embodiment of the present invention, the system further comprises primary memory for intermediate storage of the data units. By e.g. using a cache memory or another suitable type of primary memory as an intermediate storage area, the transaction data can be analysed in real-time, if required. Cache memories are comparably small memory devices with very short access times. Hence, cache memories are well-adapted for real-time applications, such as market surveillance.

In yet an embodiment of the present invention, the system further comprises secondary memory for permanent or semi-permanent storage of the data units, wherein the established index facilitates subsequent access of data units recorded in the secondary memory.

In various embodiments of the present invention, when primary memory utilization degree reaches a predetermined upper threshold level, indicating e.g. that the primary memory is full or that a predetermined flush level has been reached (which can be used as a safety margin such that incoming data can be stored while moving data simultaneously to the secondary memory), or if an on-the-fly flush instruction is received by the primary memory, the data units—i.e. compressed data subsets and data subset identifiers—are transferred to the secondary memory for permanent or semi-permanent storage. The data units can subsequently be searched and analysed, for instance for detection of market abuse or for windowing market activity. By storing historical data in the secondary memory, being a slower and more inexpensive form of memory than e.g. a cache memory, for instance a hard disk drive, large amounts of market transaction data can be stored for subsequent analysis. When analysing historical data, memory access lead times are not as critical as when performing real-time analyses. Thus, inexpensive and easily scalable storage of historical market transaction data is facilitated.

In an alternative embodiment of the present invention, data units can be directly written to, and stored in, the secondary memory, without first having been intermediately stored in the primary memory. In case only analysis of historical data is desirable, the data units are directly written to the secondary memory, in which the primary memory could be used for other purposes than storing data units. Ultimately, in case the data units are written directly to the secondary memory, the primary memory could be omitted altogether. This would be highly advantageous in case a cost-effective system is to be provided where only historical analysis is required.

A combination of the two precedingly discussed embodiments is possible, where data units occasionally are stored in the primary memory and occasionally are written directly to the secondary memory.

In an embodiment of the present invention, the data units are transferred to the secondary memory from the primary memory until the primary memory utilization degree falls to a predetermined lower threshold value, wherein a next transfer of data units from the primary memory to the secondary memory is performed when the primary memory utilization degree again reaches the predetermined upper threshold value. Hence, data units may be transferred until the primary memory is emptied or until memory utilization degree falls to a threshold value which is set such that a smaller number of data units are retained in the primary memory, i.e. the primary memory is not completely emptied. This is advantageous in case a real-time data analysis is in progress when data units are transferred from the primary memory to the secondary memory. It is noted that the actual transfer of data units from the primary memory to the secondary memory may be executed by the processing device instructing the primary memory or alternatively, the primary memory itself may be arranged to carry out transfer of data units. As has been mentioned hereinabove, it is also possible that the primary memory receives an instruction to transfer data the secondary memory even though a predetermined threshold value has not been reached.

In a further embodiment of the present invention, the established index is arranged to indicate physical location of each data unit in the primary memory and the secondary memory. When the market transaction data received by the system is separated into data subsets and each subset is assigned an identifier, the identifier may for instance designate the market participant effecting the transaction. Thus, the identifier indicates "broker firm A" to be responsible for the transaction. Of course, possible subsequent data subsets pertaining to "broker firm A" may be allocated this particular identifier. Data units are created each comprising a compressed data subset and the associated identifier, which data units initially are stored in the primary memory and later on in the secondary memory. In this particular example, the index is arranged to indicate where data units pertaining to "broker firm A" is located. Thus, the index may be embodied as "A, start_address, end_address", indicating market participant "A" and where the transaction data pertaining to this particular participant physically can be located. The index may due to address mapping have a certain appearance while the data units reside in primary memory, and another appearance when the data units are transferred to secondary memory. It should further be noted that not every data unit pertaining to a particular market participant may be stored sequentially in the memories. Hence, the index may alternatively be embodied as "A, start_address1, end_address1, start_address2, end_address2".

In a further embodiment of the present invention, the established index is arranged to comprise a timestamp indicating timing parameters of the received data. When the market transaction data received by the system is separated into data subsets and each subset is assigned an identifier, the identifier may for instance indicate various timing parameters regarding the transaction. Thus, the identifier may indicate the point in time when an order was placed at a security exchange, as well as the point in time when a deal was closed. The index is established on the basis of these transaction data timing parameters. In this particular example, the index may be embodied as "start_trans_time, end_trans_time, start_address, end_address". Subsequently, if an analysis is to be performed on historical data in the secondary memory, the index can advantageously be used to physically fetch data units recorded in a particular time interval.

It is understood that the established index can be elaborated in great detail. For instance, an index may be established by the processing device to comprise the information of the respective index of the two precedingly described embodiments. Such an index could be embodied as "A, start_trans_time, end_trans_time, start_address, end_address". Such an index would be advantageous if an analysis of historical data was to be undertaken where activity of a particular market participant in a certain time window is to be investigated.

In an alternative embodiment, the processing device establishes a plurality of indices on the basis of the assigned identifiers, for instance the two different indices discussed in the above. These different indices can then be combined to facilitate subsequent location and access of data units recorded in the secondary memory. The use of different indices makes for a more flexible search approach, whereas the use of a single index is more straightforward and avoids increased processor load when multiple indices are to be established and subsequently combined for secondary memory search to be performed.

With the interface, the processing device providing indexed data and the memory structure according to embodiments of the present invention a high capacity system is provided which further is easily scalable. Traditionally, market transaction data have been loaded in their entirety into memory.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
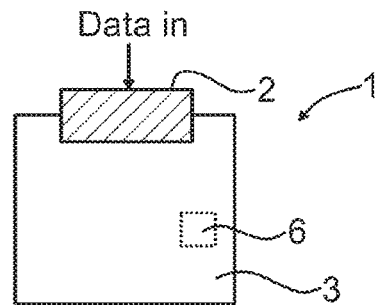
FIG. 1 illustrates a system according to an embodiment of the present invention.

FIG. 1 shows a system 1 according to an embodiment of the present invention comprising an interface 2 and a processing device 3. Data are input to the system via the interface 1. The system may be embodied in the form of a security exchange, in which the case the data input typically is embodied in the form of market transaction data/order data or other, similar, type of data.

The processing device 3 is typically embodied in the form of a specific- or general-purpose computer comprising a processor 6 arranged to execute program code downloaded to a suitable storage area associated with the processor, such as a RAM, a Flash memory or a hard disk. In an embodiment of the present invention, the processor is arranged to at least partly carry out the method according to the present invention when appropriate program code comprising computer-executable components is downloaded to the memory and executed by the processor. The processor may alternatively be embodied in the form of an application specific integrated circuit (ASIC), a field-programmable gate array (FPGA), a complex programmable logic device (CPLD), etc.

Typically, large amounts of data are received via the interface, and to subsequently be able to locate and process the data in a swift manner, the processing device 2 is arranged to separate the received data in a plurality of data subsets, compress each data subset and assign an identifier to each compressed data subset, whereby data units each comprising a compressed data subset and an associated identifier are created.

Figure 2A:
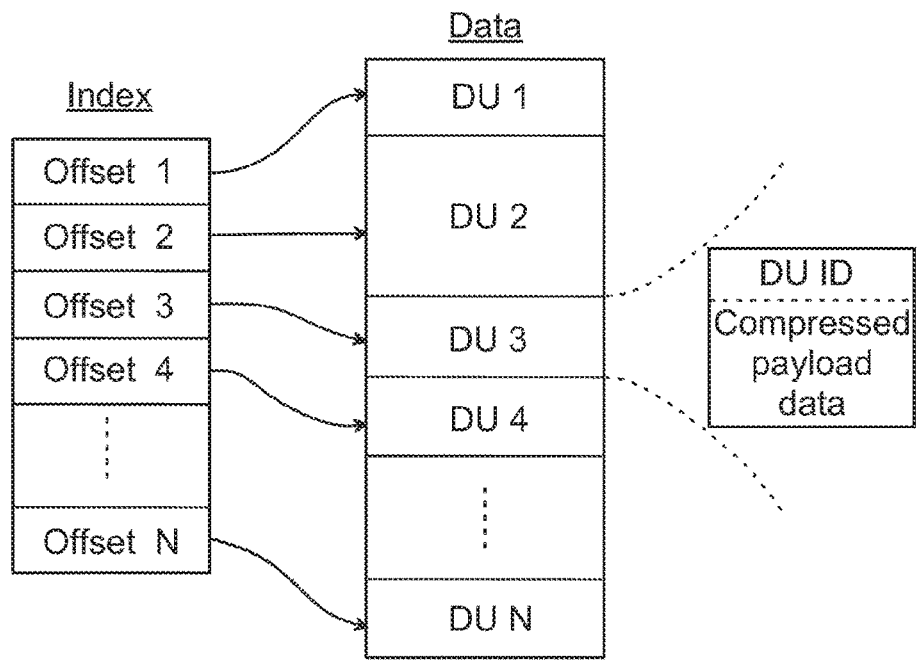
FIG. 2a illustrates an index and data file structure according to an embodiment of the present invention.

This is illustrated by means of FIG. 2a and the flow chart of 2b, where a large volume of data is received in step S201 and separated into N data subsets in step S202. Thereafter, each subset is compressed in step S203 and an identifier is assigned to each compressed data subset in step S204. Compressing technologies which may be utilized comprise e.g. zlib, bzip2 and snappy. Thus, a data unit comprising a compressed data subset and an associated identifier is created. The data units are denoted DU 1, DU 2, etc., in FIG. 2a. Each data unit hence comprises an identifier DU ID and compressed payload data, which is exemplified by DU 3. The processor 2 is further arranged to establish, in step S205, an index on the basis of the assigned data subset identifiers. The established index advantageously facilitates subsequent access of data units recorded in an appropriate memory. As can be seen in FIG. 2a, in this particular example, the index file contains N posts, where each index entry denoted Offset is associated with each identifier DU ID and thus each single data unit DU. In an embodiment of the present invention, the established index is arranged to indicate physical location of each data unit in the memory in which the data units are stored. As a result, index entry Offset 1 may comprise DU ID 1 and the physical address where the associated data payload is located. In a further embodiment, each index entry comprises a time stamp indicating timing parameters of the compressed payload data. In a typical application, a security market supervisor will want to have fast access to data recorded in the system during a particular timing window. As previously has been mentioned, if data are to be analysed for detecting certain patterns indicating possible market abuse, the established index can be utilized to find and decompress required data. Further, a windowing view of the received data can be provided. Advantageously, a complete order book view can for instance be provided at any given time of the day without loading and/or processing all transactions prior to the window of interest.

Figure 3:
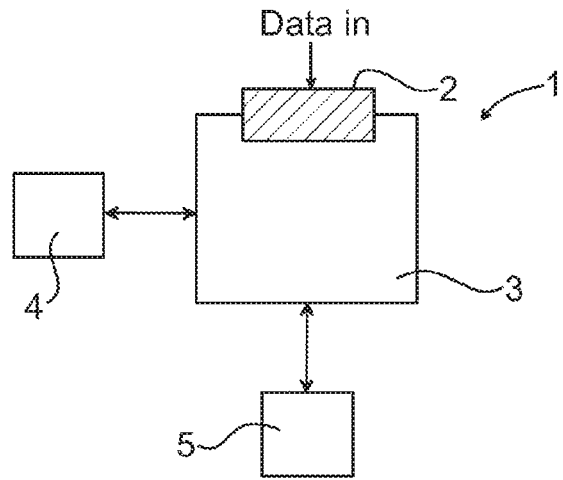
FIG. 3 illustrates a system according to a further embodiment of the present invention.

With reference to FIG. 3, in an embodiment of the present invention, the system 1 further comprises primary memory 4, such as cache memory, for intermediate storage of the data units, thereby facilitating analysis of transaction data in real-time. Again with reference to FIG. 3, in a further embodiment of the present invention, the system comprises secondary memory 5 for permanent or semi-permanent storage of the data units, thereby facilitating analysis of historical transaction data, wherein the established index facilitates subsequent access of the data units recorded in the secondary memory. From a general point of view, the secondary memory will have a considerably greater storage capacity than the primary memory. Thus, the established index is of greater importance for accessing the secondary memory, even though the index is helpful for searching the primary memory as well.

As can be seen, both the primary memory 4 and the secondary memory 5 are depicted in FIG. 3. However, it should be noted that the system in embodiments of the present invention may comprise either of the two memories. For instance, in case only real-time analysis is required, it is sufficient to include only the primary memory, whereas if only historical analysis is desired, only the secondary memory is necessary. Further, primary memory may be employed for recent data while secondary memory is used for older data. However, if a fully flexible system is to be provided, a primary as well as a secondary memory is included in the system. The primary memory 4 is typically located physically close to the processing device 3. The secondary memory 5 could be located close to the processing device, but could alternatively be remotely arranged from the processing device.

Figure 2B:
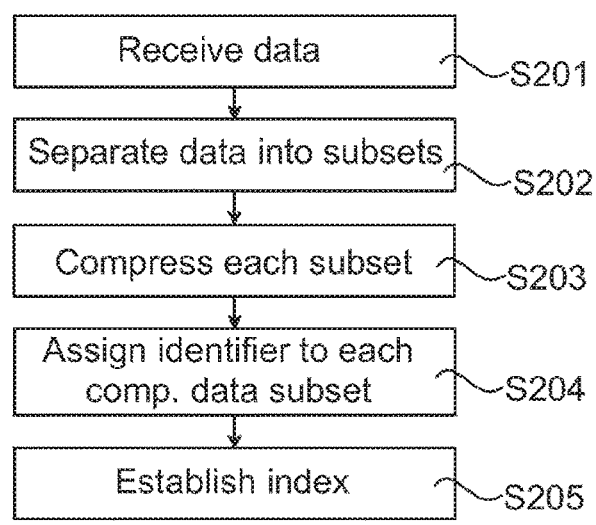
FIG. 2b illustrates a flow chart illustrating a method according to an embodiment of the present invention.
Figure 4:
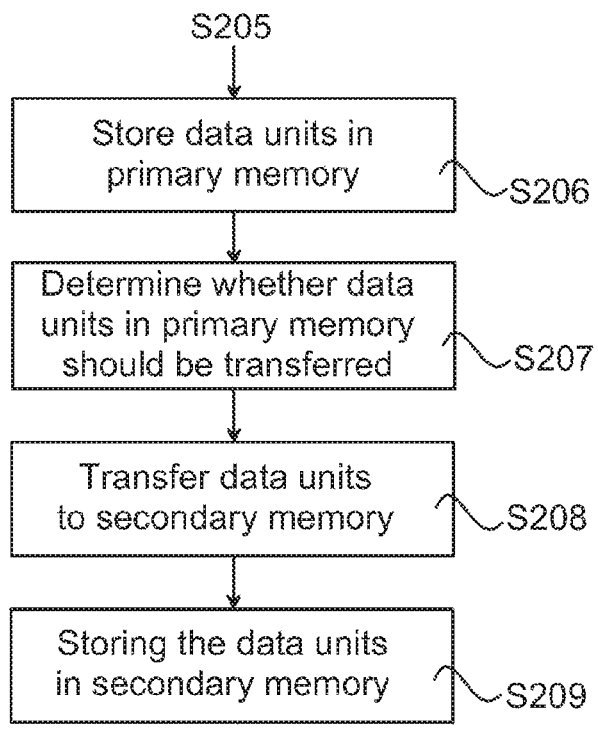
FIG. 4 illustrates a flow chart illustrating a method according to a further embodiment of the present invention.

The flow chart of FIG. 4 (being an extension of the flow chart of FIG. 2b) together with the block diagram of FIG. 3 illustrates a further embodiment of the present invention. In this embodiment, The data units are stored in the primary memory 4 in step S206, and when utilization degree of the primary memory reaches a predetermined upper threshold level in step S207, i.e. when the system 1 has received a certain amount of data via the interface 2 and the processing device 3 has separated the received data into data units as previously described, which upper level indicates e.g. that the primary memory is full or that a predetermined flush level has been reached, the data units are transferred in step S208 to the secondary memory 5 for permanent or semi-permanent storage, step S209. The data units are transferred to the secondary memory from the primary memory until the primary memory utilization degree falls to a predetermined lower threshold value, wherein a next transfer of data units from the primary memory to the secondary memory is performed when the primary memory utilization degree again reaches the predetermined upper threshold value. The data units can subsequently be searched in the secondary memory and analysed by using the established index to find desired data units.

With further reference to the flow chart of Figure, in step S207 it is determined whether data units should be transferred from the primary memory to the secondary memory. This is not necessarily dictated by the primary memory utilization degree reaching a certain predetermined level, but could alternatively be controlled by a data transfer instruction executed by the processing device, possible as a consequence of an operator requesting the data transfer. As previously has been mentioned, data units could be written directly to the secondary memory 5 from the processing device 3, without passing through the primary memory 4.

As was discussed in connection to FIG. 2a, the established index is arranged to indicate physical location of each data unit in the primary memory and the secondary memory. When the market transaction data received by the system is separated into data subsets and each subset is assigned an identifier, the identifier may be arranged to indicate any information which subsequently could be valuable for the market supervisor. For instance, the market participant responsible for the transaction could be designated by "A, start_address, end_address", where "A" indicates the particular market participant and "start_address, end_address" indicates the physical address in memory where the data unit of interest is located. Typically, a search for market participant "A" in an index file will return a plurality of physical addresses since each respective participant typically is involved in a great number of transactions. Attaining fast access to a large number of data units by practically pressing a search button is highly advantageous; the index file can easily be searched for different identifiers and the corresponding data will be returned more or less instantly.

Further, the index is advantageously arranged to comprise timestamps for the data units, thereby indicating when the market transaction data was received via the system interface. For instance, a complete order book view can be provided at any given time of the day without loading and/or processing all transactions prior to window of interest. In this particular example, the index is embodied as "start_trans_time, end_trans_time, start_address, end_address". Thus, by searching the index file for a particular time interval, for instance all transactions made between 11:02 and 11:04 a given day, the market supervisor will be given the physical location to data recorded during the required time interval, which subsequently can be decompressed and analysed.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A system configured to access recorded data for detecting market abuses amongst market transactions, the system comprising:
    a processor;
    a primary memory; and
    a secondary memory, wherein the system is configured to:
        receive data via an interface of the system;
        separate the received data into data subsets;
        apply a compression technique to compress each data subset such that each data subset includes compressed payload data;
        assign identifiers to each compressed data subset to create data units;
        establish an index on the basis of the identifiers assigned to each compressed data subset, wherein the index indicates a physical location of each data unit in the primary memory and the secondary memory, the index having one or more index entries, and each index entry comprising:
            an identifier from the assigned identifiers;
            timing parameters corresponding to at least a point in time when an order was placed at an exchange and a point in time when a transaction associated with the order closed; and
            memory address parameters of memory locations that contain the data units associated with the order;
        search at least one of the primary memory and the secondary memory, for the data units, using the established index;
        decompress the data units associated with the order within a window of time using the timing parameters; and
        present a windowing view of an orderbook using the decompressed data units based on the window of time associated with the timing parameters.

2. The system of claim 1, wherein the memory address parameters include a first start address and a first end address.

3. The system of claim 1, wherein
    the primary memory includes a cache memory; and
    the secondary memory includes a persistent storage memory.

4. The system of claim 3, wherein the system is further caused to search in both the primary memory, by accessing the cache memory for real-time analysis, and the second memory, by accessing the persistent storage memory for historical analysis, using the established index.

5. The system of claim 3, wherein the primary memory is configured to store the data units created by the processing device, the stored data units being transferred from the primary memory when a primary memory utilization degree reaches an upper threshold value.

6. The system of claim 5, wherein the system is further caused to transfer the data units to the secondary memory until the primary memory utilization degree falls to a lower threshold value, wherein a next transfer of data units from the primary memory to the secondary memory is performed when the primary memory utilization degree again reaches the upper threshold value.

7. The system of claim 3, wherein the primary memory is configured to store the created data units, the stored data units being transferred from the primary memory to the secondary memory when the primary memory receives a memory flush instruction.

8. The system of claim 1, wherein the system is further caused to locate a group of compressed data subsets based on an interval of time associated with the timing window defined by the timing parameters associated with each index entry and decompress each data subset in the group of compressed data subsets thereby generating decompressed payload data.

9. A method for accessing recorded data, comprising:
    at an information processing system having at least a processor, a primary memory, and a secondary memory:
        receiving data via an interface of the information processing system;
        separating the received data into data subsets;
        applying a compression technique to compress each data subset such that each data subset includes compressed payload data;
        assigning identifiers to each compressed data subset to create data units;
        establishing an index on the basis of the identifiers assigned to each compressed data subset, wherein the index indicates a physical location of each data unit in the primary memory and the secondary memory, the index having one or more index entries, and each index entry comprising:
an identifier from the assigned identifiers; and
timing parameters corresponding to at least a point in time when an order was placed at an exchange and a point in time when a transaction associated with the order closed;
searching at least one of the primary memory and the secondary memory, for the data units, using the established index; and
decompressing the data units associated with the order within a window of time using the timing parameters.

10. The method of claim 9, wherein each index entry further comprises memory address parameters of memory locations that contain the data units associated with the order.

11. The method of claim 10, wherein the memory address parameters include a first start address, a first end address, a second start address, and a second end address.

12. The method of claim 9, further comprising locating a group of compressed data subsets based on an interval of time associated with the timing window defined by the timing parameters associated with each index entry and decompressing each data subset in the group of compressed data subsets thereby generating decompressed payload data.

13. The method of claim 9, further comprising searching the primary memory for real time analysis and searching the secondary memory for historical analysis using the established index.

14. A system, comprising:
one or more terminal devices; and
an information processing system having at least a primary memory and a secondary memory, wherein the information processing system is configured to:
receive data via an interface of the information processing system;
separate the received data into data subsets;
apply a compression technique to compress each data subset such that each data subset includes compressed payload data;
assign identifiers to each compressed data subset to create data units;
establish an index on the basis of the identifiers assigned to each compressed data subset, wherein the index indicates a physical location of each data unit in the primary memory and the secondary memory, the index having one or more index entries, and each index entry comprising:
an identifier from the assigned identifiers; and
timing parameters corresponding to at least a point in time when an order was placed at an exchange and a point in time when a transaction associated with the order closed;
search at least one of the primary memory and the secondary memory, for the data units, using the established index; and
decompress the data units associated with the order within a window of time using the timing parameters.

15. The system of claim 14, wherein each index entry further comprises memory address parameters of memory locations that contain the data units associated with the order.

16. The system of claim 15, wherein the memory address parameters include a first start address and a first end address.

17. The system of claim 14, wherein the information processing system is further configured to locate a group of compressed data subsets based on an interval of time associated with the timing window defined by the timing parameters associated with each index entry and decompress each data subset in the group of compressed data subsets thereby generating decompressed payload data.

18. The system of claim 14, wherein the information processing system is further configured to search the primary memory for real time analysis and search the secondary memory for historical analysis using the established index.

19. The method of claim 9, further comprising:
presenting a windowing view of an orderbook using the decompressed data units based on the window of time associated with the timing parameters.

20. The system of claim 14, wherein the information processing system is further configured to:
present a windowing view of an orderbook using the decompressed data units based on the window of time associated with the timing parameters.

* * * * *